United States Patent
Adragna et al.

(10) Patent No.: US 8,172,326 B2
(45) Date of Patent: May 8, 2012

(54) PIVOT JOINT ASSEMBLY FOR A VEHICLE SEAT

(75) Inventors: Vincent Adragna, New Hudson, MI (US); David J. Abdella, Royal Oak, MI (US); Kevin Fudala, Dearborn, MI (US)

(73) Assignee: Lear Corporation, Southfield, MI (US)

( * ) Notice: Subject to any disclaimer, the term of this patent is extended or adjusted under 35 U.S.C. 154(b) by 78 days.

(21) Appl. No.: 12/075,946

(22) Filed: Mar. 14, 2008

(65) Prior Publication Data

US 2009/0230752 A1    Sep. 17, 2009

(51) Int. Cl.
  B60N 2/06   (2006.01)
  B60N 2/16   (2006.01)
  F16B 19/08  (2006.01)

(52) U.S. Cl. ......... 297/344.17; 297/344.15; 297/344.16; 411/501

(58) Field of Classification Search ............. 297/344.15, 297/344.16, 344.17, 361.1, 362.11, 362.12, 297/362.13, 362.14; 411/501
  See application file for complete search history.

(56) References Cited

U.S. PATENT DOCUMENTS

| | | | |
|---|---|---|---|
| 3,596,982 A * | 8/1971 | Grams ................ 297/344.17 X |
| 4,759,587 A * | 7/1988 | Bucka ................ 297/362.11 |
| 4,966,045 A * | 10/1990 | Harney ............... 297/344.17 X |
| 5,047,896 A * | 9/1991 | Zust ................... 361/784 |
| 5,487,294 A | 1/1996 | Petersen |
| 5,795,024 A * | 8/1998 | Collins et al. ......... 297/361.1 |
| 5,860,780 A * | 1/1999 | Lenac et al. .......... 411/501 |
| 5,868,470 A * | 2/1999 | Hyder et al. .......... 297/362.14 |
| 6,035,516 A | 3/2000 | Petersen |
| 6,039,399 A * | 3/2000 | Whalen et al. ......... 297/362.12 |
| 6,095,475 A * | 8/2000 | Willms et al. ......... 297/344.15 X |
| 6,338,191 B1 | 1/2002 | Petersen |
| 6,352,311 B1 | 3/2002 | Hayotte |
| 6,662,422 B2 | 12/2003 | Pradhan |
| 6,823,575 B2 | 11/2004 | Petersen |
| 6,836,951 B2 | 1/2005 | Dudash et al. |
| 6,948,772 B1 * | 9/2005 | Robinson et al. ....... 297/362.12 |
| 7,066,540 B2 * | 6/2006 | Minai et al. .......... 297/344.15 |
| 7,140,589 B2 * | 11/2006 | Woodard et al. ........ 297/344.17 X |
| 7,316,454 B2 * | 1/2008 | Yoshida .............. 297/344.15 X |
| 7,513,571 B2 * | 4/2009 | Hofmann et al. ....... 297/344.15 |
| 2005/0035641 A1 | 2/2005 | Petersen |
| 2007/0158988 A1 | 7/2007 | Yoshida |
| 2007/0194613 A1 * | 8/2007 | Kojima ............... 297/344.15 |
| 2007/0295882 A1 * | 12/2007 | Catton ............... 297/344.16 X |

OTHER PUBLICATIONS

Chinese Office Action, Application No. 200910117861.7, dated May 30, 2011.

* cited by examiner

*Primary Examiner* — Rodney B White
(74) *Attorney, Agent, or Firm* — MacMillan, Sobanski & Todd, LLC

(57) ABSTRACT

A pivot joint assembly includes a bar generally defining an outer cylindrical surface. The bar has first and second beads extending outwardly from the outer cylindrical surface. The first and second beads are spaced apart from one another along the length of the bar. At least one of the first and second beads is an integrally formed portion extended outwardly from the outer cylindrical surface. The assembly further includes a mounting member having opposed first and second sides. The mounting member has a hole formed therein. The bar is disposed in the hole such that the mounting member is disposed between the first and second beads such that bar rotates relative to the mounting member.

10 Claims, 4 Drawing Sheets

PIVOT JOINT ASSEMBLY FOR A VEHICLE SEAT

BACKGROUND OF THE INVENTION

This invention relates in general to pivot joint assemblies, such as for example, those used in vehicle seat frames. Vehicle seats typically include a seat back mounted on a seat cushion or bottom. The seat back is pivotally mounted on the seat bottom for adjusting the seat back at a desired inclined angle relative to the seat bottom. The seat bottom is commonly mounted on the floor of the vehicle such that the position of the seat relative to the floor can be adjusted. Typically, the seat includes a mounting assembly attached between the floor and the seat bottom for adjusting the seat bottom in a fore and aft direction.

The mounting assembly may also be configured to adjust the vertical height of the seat bottom relative to the vehicle floor. To accomplish this, the mounting assembly may include an upper frame assembly connected to the seat bottom, and a lower frame assembly fixedly connected to the vehicle floor. The upper frame assembly is connected to the lower frame assembly by a pair of links which are pivotally connected to the upper and lower frame assemblies. The links and the lower and upper frame assemblies form a four bar linkage. A lifting mechanism is connected between the upper and lower frame assemblies. A typical lifting mechanism is a linear electric power screw drive unit that includes a cylinder and an arm which is threadably engaged with the cylinder. Rotation of the cylinder or arm, such as by an electric motor, causes the arm to extend or retract relative to the cylinder. To move the seat bottom, the lifting mechanism is operated to pivot the upper frame assembly about the pivoting links. The links are oriented such that the upper frame assembly may be moved upwardly and downwardly upon rotation of the links.

Commonly, the upper frame assembly includes a pair of side brackets extending along the left and right-hand sides of the seat. The brackets are spaced from one another by a front bar and a rear bar. The bars are either solid or tubular. The bars are pivotally connected to the side brackets. Ends of the links are fixedly connected to the bars. The other ends of the links are pivotally connected to the lower frame assembly. As the upper frame assembly is moved by the lifting mechanism, the front and rear bars pivot relative to the brackets. In the past, the pivoting connection of the ends of the front and rear bars to the side brackets was provided by forming a small diameter end portions which were inserted into holes formed through the respective side brackets. The narrowing of the small diameter portion defines a shoulder in the ends of the bars which abuts against the inboard side of the bracket. Star lock washers are inserted on the ends of the small diameter portions extended slightly outwardly from the outboard side of the side brackets. The star lock washers prevent the ends of the bars from being pulled out of the holes while permitting a pivoting connection. Instead of using star lock washers, it is also known to peen over the ends of the small diameter portions on the outboard side of the brackets, thereby forming an enlarged mushroomed or rivet type of head portion. Although these types of connections provide the necessary pivoting joint, they often do not provide enough lateral support between the bracket and the bar such that the bracket is susceptible to undesirable movement in an axial direction with respect to the length of the bar. Thus, the upper seat frame may rock or move slightly in the lateral direction.

Outside of the seat frame assembly industry, it is also known to form a non-pivoting connection between a tube and a flat plate or member by means of swaging two portions of the tube to form radially outwardly extending beads, thereby trapping the bracket therebetween. Such a method is described in U.S. Pat. No. 6,823,575 which is incorporated by reference herein. Although this method may provide adequate support such that the plate is generally prevented from undesirable axial movement, this known method of swaging does not permit a pivoting connection between the tube and the plate.

SUMMARY OF THE INVENTION

This invention relates to pivot joint assemblies and in particular to a pivot joint assembly including a bar generally defining an outer cylindrical surface. The bar has first and second beads extending outwardly from the outer cylindrical surface. The first and second beads are spaced apart from one another along the length of the bar. At least one of the first and second beads is an integrally formed portion extended outwardly from the outer cylindrical surface. The assembly further includes a mounting member having opposed first and second sides. The mounting member has a hole formed therein. The bar is disposed in the hole such that the mounting member is disposed between the first and second beads such that bar rotates relative to the mounting member.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
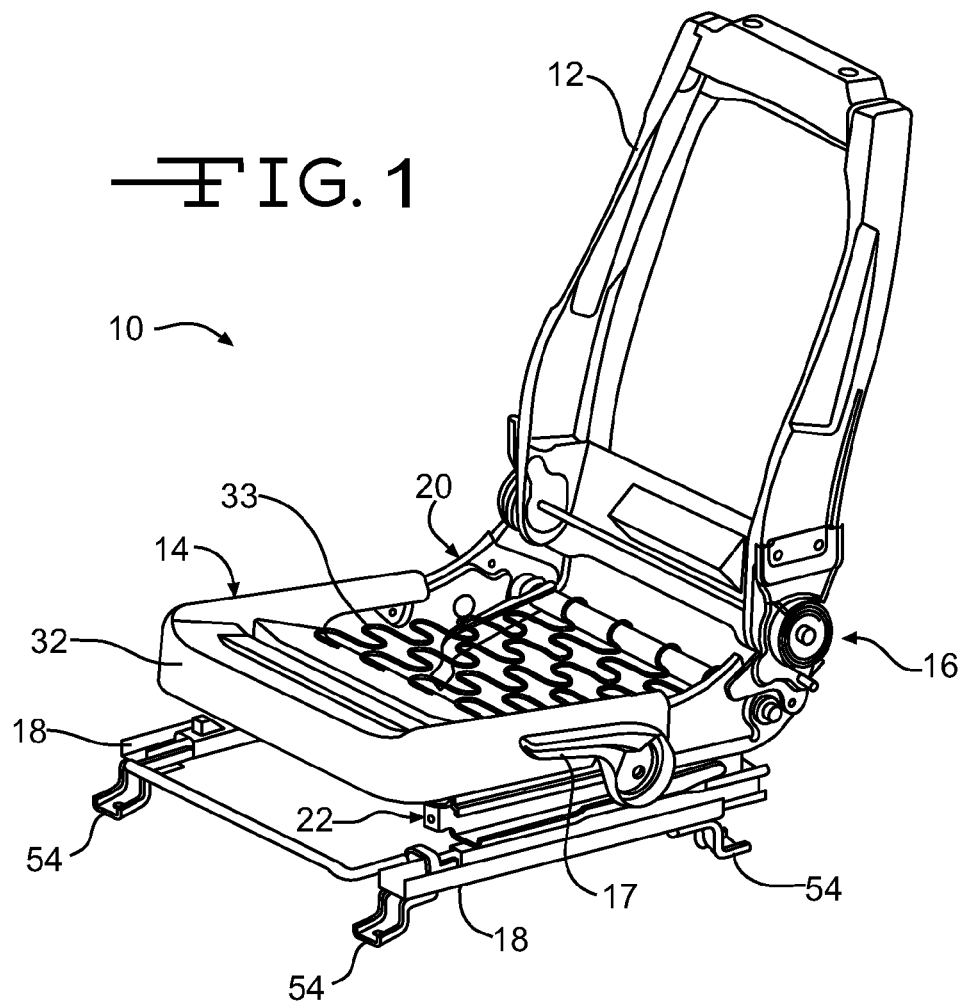
FIG. 1 is a perspective view of a vehicle seat frame.

Referring now to the drawings, there is illustrated in FIG. 1 a vehicle seat frame, indicated generally at 10. The seat frame 10 includes a seat back frame 12 and a seat bottom frame, indicated generally at 14. To form a completed vehicle seat, the frames 12 and 14 are covered with padding and an outer trim cover layer (not shown). The seat back frame 12 is pivotally mounted to the seat bottom frame 14 via a recliner mechanism, indicated schematically at 16, for adjusting the seat back frame 12 to a desired inclined angle relative to the seat bottom frame 14. The recliner mechanism 16 may be operated manually by a handle 17 or may include a motor drive unit (not shown) for electric operation. The seat frame 10 further includes a mounting frame assembly 18 which mounts the seat bottom frame 14 to the floor of the vehicle in which the seat frame 10 is installed. As will be described below, the mounting frame assembly 18 may be configured to move the seat frame 10 in fore and aft directions, as well as in a generally vertical direction.

Figure 2:
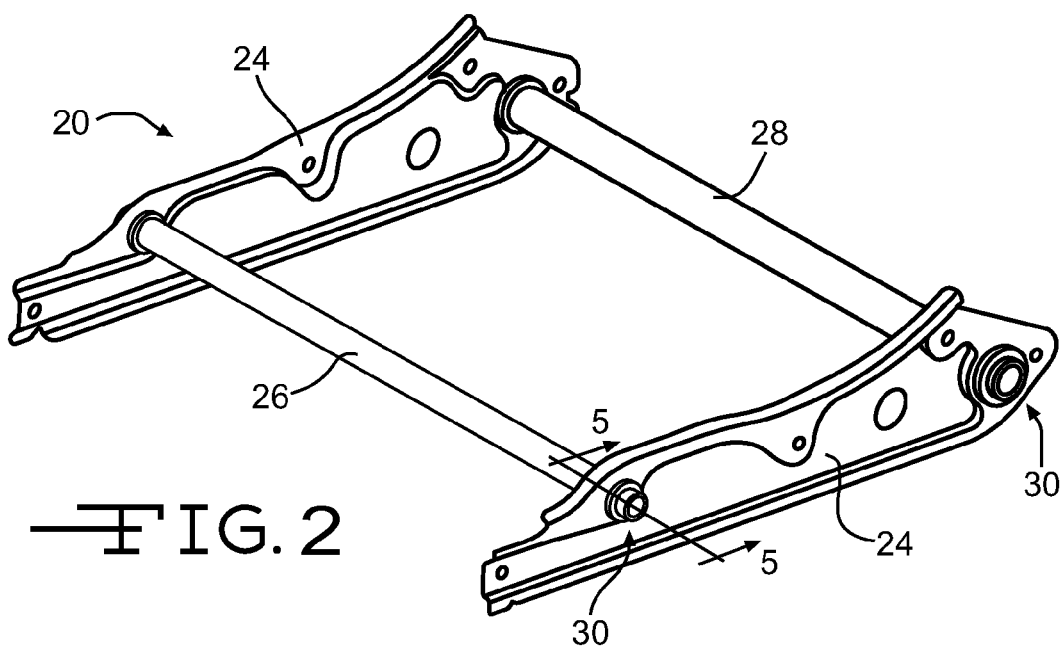
FIG. 2 is an enlarged perspective view of a frame assembly of the seat frame of FIG. 1 illustrating a pivot joint assembly.
Figure 3:
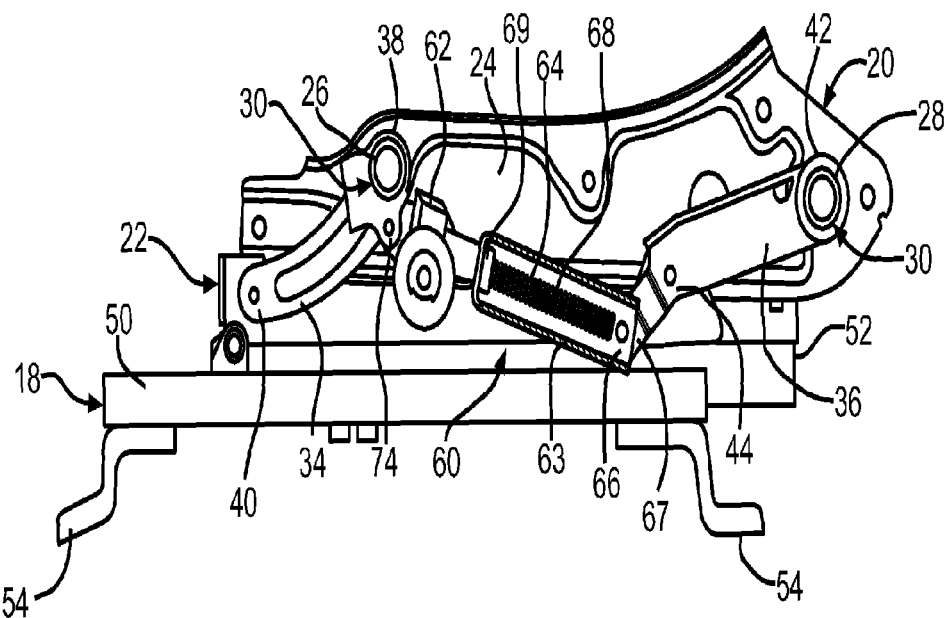
FIG. 3 is an elevational side view of a portion of the seat frame of FIG. 1.
Figure 4:
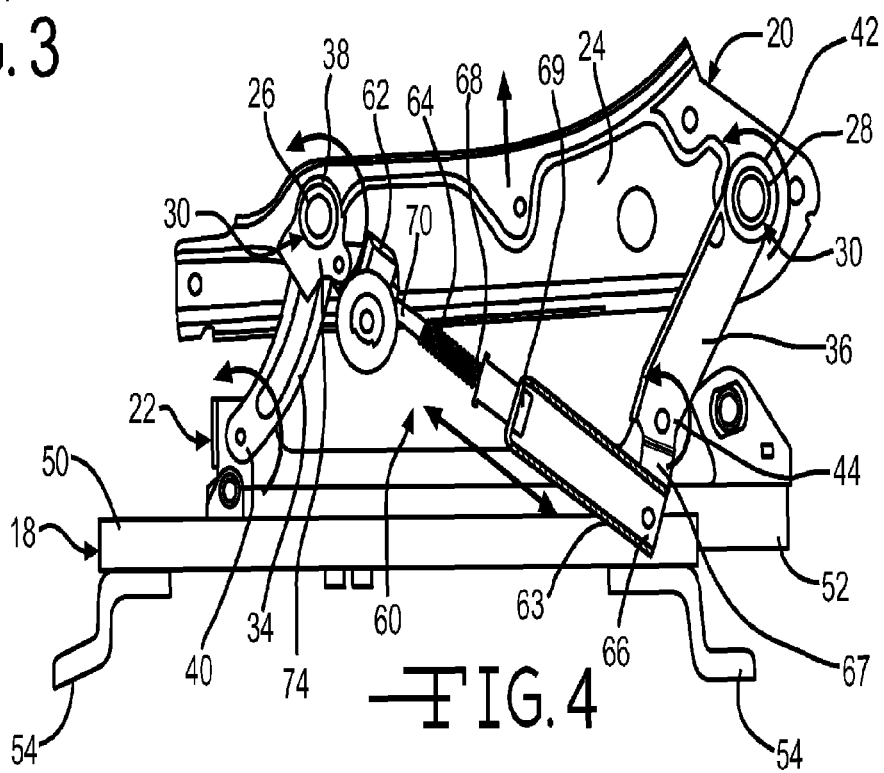
FIG. 4 is an elevational side view similar to FIG. 3 showing the seat bottom frame moved to a raised position.
Figure 5:
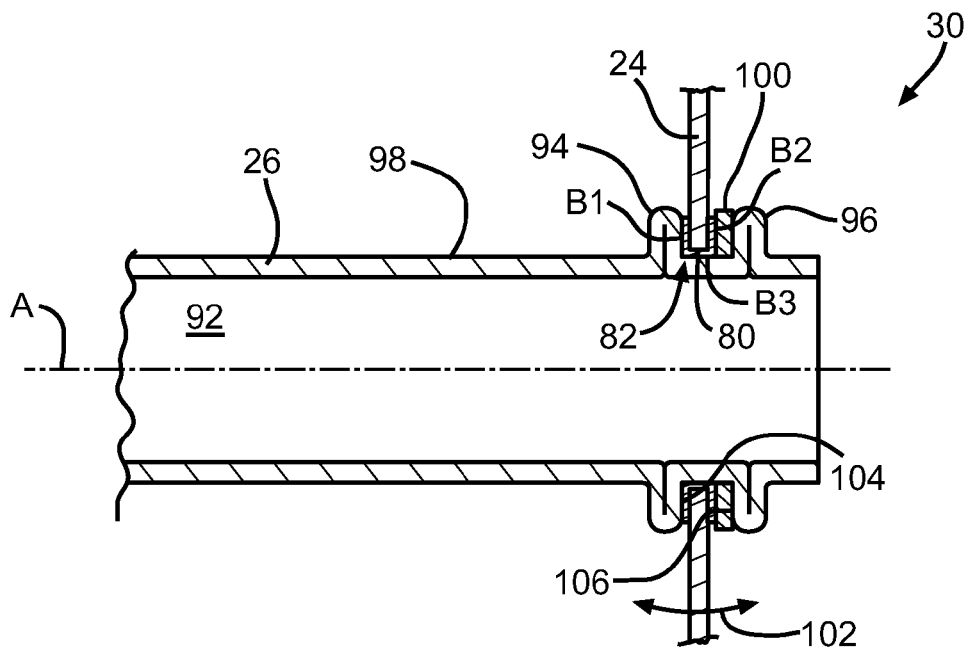
FIG. 5 is sectional view taken along lines 5-5 of FIG. 2 through one of the pivot joints.

As best shown in FIGS. 2-4, the seat bottom frame 14 includes an upper frame assembly 20. The mounting frame assembly 18 includes a lower frame assembly 22. As will be discussed below, the upper frame assembly 20 is movably mounted relative to the lower frame assembly 22 for adjusting the height of the seat frame 10 relative to the floor of the vehicle. As shown in FIG. 2, the upper frame assembly 20 includes a pair of side brackets 24 which extend in a fore and aft direction along the lateral sides of the seat bottom frame 14. The side brackets 24 can be made of any suitable material, such as steel, and may be formed from a stamped piece. The upper frame assembly 18 further includes a front bar 26 and a rear bar 28 extending between the side brackets 24. In one embodiment, each end of the bars 26 and 28 are connected to the side brackets 24 by a pivot joint, indicated generally at 30. An enlarged sectional view of a pivot joint 30 is illustrated in FIG. 5. As will be describe below, the pivot joints 30 permit the bars 26 and 28 to rotate relative to the side brackets 24. In one embodiment, the bars 26 and 28 have a cylindrical tubular shape, thus having a hollow interior. The bars 26 and 28 can be made of any suitable material, such as steel. The seat bottom frame 14 may further include a seat pan 32 and a spring wire platform 33 attached to the upper frame assembly 20 for generally defining the front and central portions of the seat bottom frame 14.

As shown in FIGS. 1, 3 and 4, the upper and lower frame assemblies 20 and 22 are connected together via a pair of front links 34 and a pair of rear links 36. The front links 34 are generally spaced from one another and are adjacent the side brackets 24. Similarly, the rear links 36 are generally spaced from one another and are adjacent the side brackets 24. The front links 34 each include a first end 38 which may be rigidly connected to the front bar 26. The front links 34 each have a second end 40 which is pivotally attached to the lower frame assembly 22. Similarly, the rear links 36 each include a first end 42 which may be rigidly connected to the rear bar 28. The rear links 36 each have a second end 44 which is pivotally attached to the lower frame assembly 22. The first ends 38 and 42 can be attached to the bars 26 and 28 by any suitable manner, such as by welding, adhesive, frictional fit or by fasteners. Alternatively, the first ends 38 and 42 may be pivotally attached to the bars 26 and 28. The second ends 40 and 44 can be pivotally attached to the side brackets 24 by any suitable connection such as for example by a rivet, star washer or peened end.

As shown in FIGS. 3 and 4, the mounting frame assembly 18 includes a pair of lower tracks 50 and a pair of upper tracks 52 defining a pair of track assemblies attached to the respective pair of side brackets 24. The lower tracks 50 are adapted to be rigidly connected to the vehicle floor via floor brackets 54. The upper tracks 52 are rigidly connected to respective side brackets 24. The upper tracks 52 are slidably mounted on the respective lower tracks 54 to provide for a fore and aft adjustment of the seat frame 10 relative to the vehicle floor. A locking mechanism (not shown) is connected between the tracks 50 and 52 for selectable locking the upper tracks 52 relative to the lower tracks 50.

To adjust the vertical height of the seat frame 10 relative to the floor, a lifting mechanism, indicated generally at 60, may be used. It should be understood that the lifting mechanism 60 shown and described is only one example of a suitable lifting mechanism and any type of mechanism capable of moving the upper frame assembly 20 relative to the lower frame assembly 22 may be used. The lifting mechanism 60 can be a single unit mounted on only one side of the seat frame 10 or may include two separate components one for each side of the seat frame 10. The illustrated lifting mechanism 60 as shown in FIGS. 3 and 4 includes a drive unit 62, a cylinder 63 (shown in cross-section in FIGS. 3 and 4), and a threaded rod 64. A first end 66 of the cylinder 63 is pivotally connected to an extension portion 67 of one of the second links 36. A second end 69 of the cylinder 63 is threadably engaged with a first end 68 of the threaded rod 64. A second end 70 of the threaded rod 64 is engaged with the drive unit 62 for rotational movement when the drive unit 62 is actuated. The drive unit 62 can include an electric motor which is operatively connected to the second end 70 of the threaded rod 64 for selectively rotating the threaded rod 64. The drive unit 62 is pivotally connected to an extension portion 74 of one of the first links 34.

The operation of the lifting mechanism 60 for adjusting the vertical height of the seat bottom frame 14 (and the attached seat back frame 12) relative to the floor will now be described. In FIG. 3, the seat bottom frame 14 is shown in a lowered position. To move the seat bottom frame 14 generally upwardly, the motor of the drive unit 62 is actuated to rotate the threaded rod 64 in a desired rotational direction. The rotation of the threaded rod 64 in threaded engagement with the cylinder 63 causes the lifting mechanism 60 to expand in length such that the threaded rod 64 extends outwardly from the cylinder 63, as shown in FIG. 4. The expansion of the lifting mechanism 60 causes the front and rear pivot links 34 and 36 to pivot about their pivoting connection with the lower frame assembly 22 in a counter-clockwise direction, as viewing FIGS. 3 and 4. The pivoting motion of the links 34 and 36 causes the upper frame assembly 20 to move upwardly and forwardly (leftward), as viewing FIGS. 3 and 4. The links 34 and 36, the upper frame member 20 and the lower frame member 22 generally function as a pair of four bar linkages.

There is illustrated in FIG. 5 an enlarged sectional view of an embodiment of the pivot joint 30. For descriptive purposes, the pivot joint connection between the front bar 26 and the side bracket 24 will be described with respect to FIG. 5 but it should be understood that this pivot connection can be any of the pivot joints 30. As discussed above, the pivot joint 30 may be formed at the pivoting connection points between the end of the bar and a respective portion of the upper frame member 20. As shown in FIG. 5, the portion of the side bracket 24 of the upper frame member 20 that supports the pivot joint 30 is generally defined as a vertically oriented flat metal stamped portion including a through hole 80. In one embodiment, surrounding the edge of the hole 80 is a bushing 82. As will be described below, the bushing 82 provides for a reduced frictional contact for the pivot joint 30. As shown in FIG. 5, the bushing 82 has a substantially U-shaped cross section having three portions defining a first bushing B1, a second bushing B2, and a third bushing B3. The pivot joint 30 includes an end portion of the bar 26 which is defined by a tube having a hollow interior 92. If desired, the entire length of the bar 26 may be formed as a tube. The bar 26 includes first and second beads 94 and 96. The beads 94 and 96 are preferably circumferential ring-like structures extending radially outwardly from an outer cylindrical surface 98 of the bar 26. The beads 94 may be formed by swaging a portion of the tube 90 radially outwardly, as will be explained below. The side bracket 24 is disposed between the first and second beads 94 and 96. An optional washer 100 may also be disposed between the upper frame member 20 and the second bead 96. The optional washer 100 may be used in the formation of the pivot joint 30 to help prevent damage to the bushing 82, as will be explained below.

The pivot joint 30 provides rotational movement of the bar 26 about an axis A defined by the length of the bar 26. It may be desired that that the pivot joint 30 is formed such that although rotational movement is permitted, lateral movement of the side bracket 24 relative to the bar 26, indicated generally by arrows 102, is minimized. Such lateral movement of the upper frame member 20 may cause undesirable rocking or lateral looseness of the upper frame member 20 of the bottom frame 14 relative to the floor. The beads 94 and 96 may have radially extending surfaces 104 and 106 which generally lie in a plane which is perpendicular to the axis A. The surfaces 104 and 106 directly contact and engage with surfaces of the bushing 82 and the washer 100, respectively, to assist in providing lateral stability of the pivot joint 30.

Figure 6:
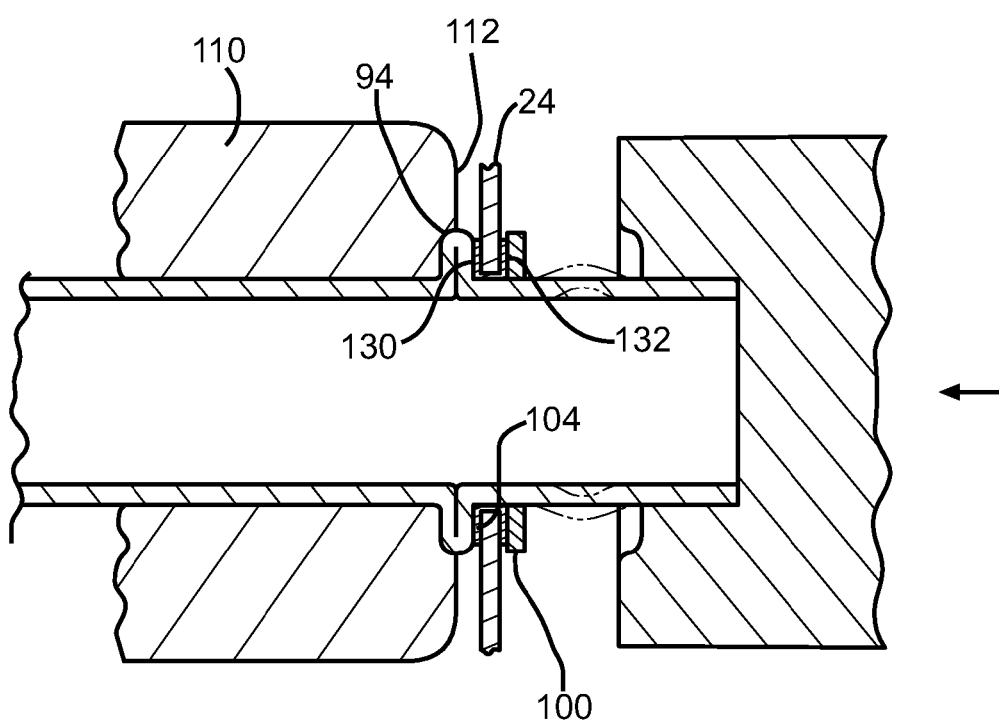
FIG. 6 is a cross-sectional view illustrating the formation of the pivot joint of FIG. 5.

One method of forming the pivot joint 30 will now be explained with respect to FIG. 6. The first bead 94 may be formed by a swaging operation. For example, the first bead 94 may be generally formed by pressing the end portion of the bar 26 (such as by a tool or punch) in an axial direction, and confirming the walls of the end portion of the bar 26 everywhere but at a place where the ring or bead 94 is to be formed such that portions of the bar 26 are forced axially outward. Such a suitable swaging method is described and illustrated in U.S. Pat. No. 6,338,191 which is incorporated by reference herein. After the first bead 94 is formed, the bar 26 is placed in a die 110 for securing the bar 26. The die 110 may have a contoured surface 112 formed in an end thereof having a corresponding contoured surface of the bead 94. The side bracket 24 is then placed over the end of the bar 26 through the hole 80 to abut against the surface 104 of the bead 94. The side bracket 24 preferably includes the bushing 82, the reason for which will be explained below. The washer 100 is then preferably placed over the end of the bar 26 adjacent the side bracket 24. A punch 120 is placed adjacent the end of the bar 26. As shown in FIG. 6, the punch 120 may include a bore 122 formed therein for receiving the end of the bar 26. The punch 120 is then advanced towards the die 110 which bulges out a portion, represented by broken lines 126, of the bar 26 radially outwardly to form the second bead 96. Continued movement of the punch 120 will form the surface 106 of the bead 96 against the washer 100. The punch 120 may include a contoured surface 122 corresponding to the desired shape of the bead 96 to assist in its formation. If desired, during formation of the first and second beads 94 and 96, a cylindrically shaped tool piece (not shown) may be inserted into the interior 92 of the bar 26 to prevent the bulge from forming radially inward, thereby forcing the portion of the bar 26 radially outwardly.

The formation of the first and second beads 94 and 96 defines a gap between the surfaces 104 and 106. In a preferred embodiment, the gap is essentially the same dimension as the widths of the side bracket 24 with bushing 82 and the washer 100 to form a tight fit. This tight fit helps reduce any lateral movement of the side bracket 24 relative to the bar 26. However, the side bracket 24, the bushing 82, and the washer 100 should not be overly compressed so as to prevent pivotal movement of the bar 26 relative to the side bracket 24. The bushing 82 provides for a reduced frictional contact between the surfaces 104 and 106 of the beads 94 and 96 and the side bracket 24 and the washer 100. Thus, the outer surfaces 130 and 132 of the bushing 82 will slide past the surface 104 of the bead 94 and the washer 100 during pivoting movement of the bar 26 relative to the side bracket 24. Alternately, contacting portions of the side bracket 24 may slide relative to the surfaces 130 and 312 of the bushing 82.

The bushing 82 can be any solid, liquid, or paste which helps to permit the pivoting motion of the bar 26 relative to the side bracket 24 after assembly of the pivot joint as described above. Examples of a suitable bushing 82 includes non-solid lubricants, such as grease, or a coating formed on the adjacent surfaces of the side bracket adjacent the hole 80. For example, the bushing 82 can be a reduced frictional coating or fluoropolymer such as polytetrafluoroethylene (PTFE), such as that commercially available from DuPont Company under the trade name Teflon. This coating may be coated around the edges adjacent the hole 80, as shown in FIG. 5 with respect to the illustrated sectioned shape of the bushing 82. The cylindrical surface portion of the edge defined by the hole 80 may or may not include bushing material.

Figure 7:
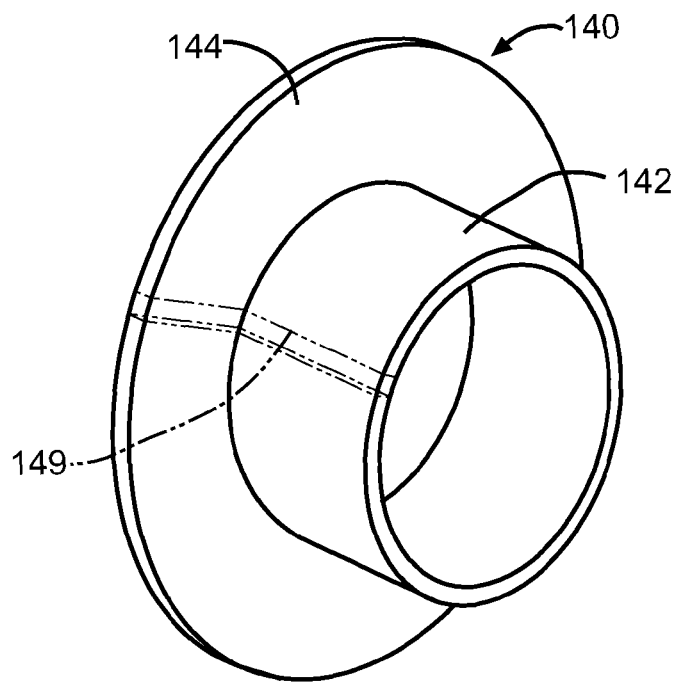
FIG. 7 is a perspective view of a bushing prior to installation on a bracket of the pivot joint assembly of FIG. 5.
Figure 8:
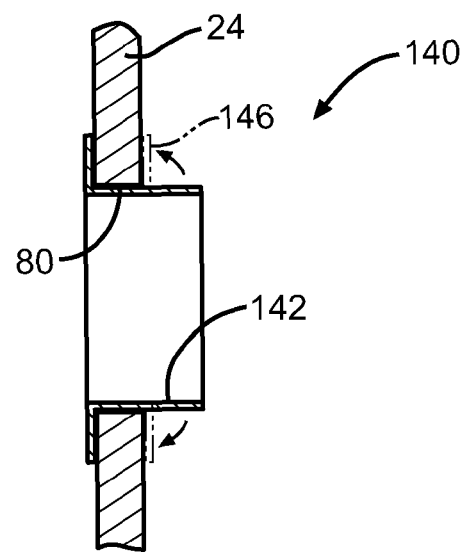
FIG. 8 is a cross-sectional view of the bushing of FIG. 7 being installed onto a bracket.

Another example of a suitable bushing 82 is a solid grommet formed in the shape of the bushing 82 (illustrated in FIG. 5). Such a grommet is shown in FIGS. 7 and 8, and is indicated generally at 140. The grommet 140 is disposed within the hole 80 of the side bracket 24. In a preferred embodiment, the grommet includes a tubular portion 142, an outwardly extending circular first flange 144, and an outwardly extending circular second flange, represented by broken lines 146 in FIG. 8 when formed. FIG. 7 illustrates the shape of the grommet 140 prior to final assembly onto the side bracket 24. FIG. 8 illustrates an assembly method of the grommet 140 onto the side bracket 24. To assemble, the tubular portion 142 is disposed though the hole 80 until the first flange 144 abuts the side bracket 24, as shown in FIG. 8. The second flange 146 is then formed by bending or forming the end of the tubular portion outwardly and against the side bracket 24. Thus, the first flange 144 defines a first bushing disposed between first bead 94 and the side bracket 24, and the second flange 146 defines a second bushing disposed between the side bracket 24 and the second bead 96. Note that the optional washer 100 may be placed between the bushing 82 and the side bracket second bead 96. The grommet 140 may include one or more slits, indicated generally by broken lines 149 in FIG. 7 to assist in this formation. The grommet 140 may be made of any material, such as a polymer or polished metal, which has a relatively low coefficient of friction for permitting rotation of the bar 26 relative to the side bracket 24 even when under a compressive load due to the formation of the pivot connection 30. Preferably, the coefficient of friction of the grommet 140 is lower than the coefficient of friction of the material of the side bracket 24 and the outer surface of the bar 26. If desired, the grommet 140 may include a low coefficient of friction coating thereon. It may be desirable that the grommet 140 be configured with relatively wide flanges (in a radial direction) for reducing the likelihood of lateral wobbling or movement of the pivot joint 30.

The washer 100 is an optional inclusion in the pivot joint 30. One of the purposes of the washer 100 is protect the bushing 82 from being overly crushed or deformed during the swaging operation of the second bead 96. The inclusion of the washer 100 is particular useful when the bushing 82 is a solid object, such as the grommet 140 described above, and which is formed of a softer material than the materials forming the bar 26 and/or side bracket 24. The washer 100 helps absorb some of the compression forces during the swaging operation forming the second bead 96 such that all of the forces are not transmitted directly to the bushing 82.

Although the bars 26 and 28 were described and shown as tubular in shape such that a portion of the tube is expanded radially outwardly and folded to form the beads 94 and 96, it should be understood that the bars 26 may be solid or partially tubular in structure. Thus, the ends of the bars 26 and 28 at the pivot joints 30 may be solid and the first and/or second beads 94 and 96 are formed by swaging a portion of the outer surface of the bar radially outwardly. It should also be understood that instead of forming both beads 94 and 96 by swaging, either of the beads may be formed by connecting a separate piece, such as a washer, to the outer surface of the bars 26 and 28. For example, the first bead 94 may be defined by a washer (not shown) welded on the bar 26. The washer defines a radially outwardly extending shoulder. The second bead 96 can then be formed by a swaging operation as described above, wherein the bushing is disposed therebetween.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. A pivot joint assembly comprising:
a mounting member having first and second sides and a hole that extends continuously through the mounting member from the first side to the second side thereof so as to define a continuous inner surface therethrough;
a bar including (1) an outer surface that is supported on the inner surface defined by the hole extending through the mounting member such that the bar is supported on the mounting member for relative rotational movement, (2) a first bead formed integrally from a first portion of the bar and extending outwardly from the outer surface so as to define a first surface, and (3) a second bead formed integrally from a second portion of the bar and extending outwardly from the outer surface so as to define a second surface;
a first bushing that is disposed between the first side of the mounting member and the first surface defined by the first bead of the bar;
a second bushing that is disposed between the second side of the mounting member and the second surface defined by the second bead of the bar; and
a washer that is disposed between the bushing and the second surface defined by the second bead of the bar, wherein
the first and second sides of the mounting member are respectively supported by the first surface defined by the first bead of the bar and the second surface defined by the second bead of the bar such that lateral movement of the bar relative to the mounting member is prevented.

2. The pivot joint assembly defined in claim 1 further including a bushing that is disposed between the first side of the mounting member and the second surface defined by the second bead of the bar.

3. The pivot joint assembly defined in claim 2 further including a washer that is disposed between the bushing and the second surface defined by the second bead of the bar.

4. The pivot joint assembly defined in claim 1 further including (1) a first bushing that is disposed between the first side of the mounting member and the first surface defined by the first bead of the bar, (2) a second bushing that is disposed between the second side of the mounting member and the second surface defined by the second bead of the bar, and (3) a third bushing that is disposed between the outer surface of the bar and the inner surface defined by the hole extending through the mounting member.

5. The pivot joint assembly defined in claim 4 further including a washer that is disposed between the bushing and the second surface defined by the second bead of the bar.

6. The pivot joint assembly defined in claim 4 wherein the first, second, and third bushings are formed integrally from a single piece of material.

7. A seat frame comprising:
a first mounting member having first and second sides and a hole that extends continuously through the first mounting member from the first side to the second side thereof so as to define a continuous inner surface therethrough;
a second mounting member having first and second sides and a hole that extends continuously through the second mounting member from the first side to the second side thereof so as to define a continuous inner surface therethrough;
a bar having a first end and a second end, wherein the first end of the bar has (1) an outer surface that is supported on the inner surface defined by the hole extending through the first mounting member such that the first end of the bar is supported on the first mounting member for relative rotational movement, (2) a first bead formed integrally from a first portion of the first end of the bar and extending outwardly from the outer surface so as to define a first surface, and (3) a second bead formed integrally from a second portion of the first end of the bar and extending outwardly from the outer surface so as to define a second surface, wherein the first and second sides of the first mounting member are respectively supported by the first surface defined by the first bead of the first end of the bar and the second surface defined by the second bead of the first end of the bar such that lateral movement of the first end of the bar relative to the first mounting member is prevented, and wherein the second end of the bar has (1) an outer surface that is supported on the inner surface defined by the hole extending through the second mounting member such that the second end of the bar is supported on the second mounting member for relative rotational movement, (2) a first bead formed integrally from a first portion of the second end of the bar and extending outwardly from the outer surface so as to define a first surface, and (3) a second bead formed integrally from a second portion of the second end of the bar and extending outwardly from the outer surface so as to define a second surface; and
a first bushing that is disposed between the first side of the mounting member and the first surface defined by the first bead of the bar;
a second bushing that is disposed between the second side of the mounting member and the second surface defined by the second bead of the bar; and
a washer that is disposed between the bushing and the second surface defined by the second bead of the bar;
wherein the first and second sides of the second mounting member are respectively supported by the first surface defined by the first bead of the second end of the bar and the second surface defined by the second bead of the second end of the bar such that lateral movement of the second end of the bar relative to the first mounting member is prevented.

8. A pivot joint assembly comprising:
a mounting member having first and second sides and a hole that extends continuously through the mounting member from the first side to the second side thereof so as to define a continuous inner surface therethrough;
a bar including (1) an outer surface that is supported on the inner surface defined by the hole extending through the mounting member such that the bar is supported on the mounting member for relative rotational movement, (2) a first bead formed integrally from a first portion of the bar and extending outwardly from the outer surface so as to define a first surface, and (3) a second bead formed integrally from a second portion of the bar and extending outwardly from the outer surface so as to define a second surface;

a first bushing that is disposed between the first side of the mounting member and the first surface defined by the first bead of the bar;

a second bushing that is disposed between the second side of the mounting member and the second surface defined by the second bead of the bar; and a third bushing that is disposed between the outer surface of the bar and the inner surface defined by the hole extending through the mounting member; wherein the first and second sides of the mounting member are respectively supported by the first surface defined by the first bead of the bar and the second surface defined by the second bead of the bar such that lateral movement of the bar relative to the mounting member is prevented.

9. The pivot joint assembly defined in claim 8 further including a washer that is disposed between the bushing and the second surface defined by the second bead of the bar.

10. The pivot joint assembly defined in claim 8 wherein the first, second, and third bushings are formed integrally from a single piece of material.

* * * * *